United States Patent
Freeman et al.

(10) Patent No.: US 11,820,716 B2
(45) Date of Patent: Nov. 21, 2023

(54) METHOD OF FABRICATING COOLING FEATURES ON A CERAMIC MATRIX COMPOSITE (CMC) COMPONENT

(71) Applicants: Rolls-Royce High Temperature Composites Inc., Cypress, CA (US); Rolls-Royce Corporation, Indianapolis, IN (US); Rolls-Royce North American Technologies Inc., Indianapolis, IN (US)

(72) Inventors: Ted Freeman, Danville, IN (US); Aaron Sippel, Zionsville, IN (US); Robert Shinavski, Mission Viejo, CA (US); Chris Barrett, Huntington Beach, CA (US)

(73) Assignees: ROLLS ROYCE NORTH AMERICAN TECHNOLOGIES INC., Indianapolis, IN (US); ROLLS-ROYCE HIGH TEMPERATURE COMPOSITES INC., Cypress, CA (US); ROLLS-ROYCE CORPORATION, Indianapolis, IN (US)

(*) Notice: Subject to any disclaimer, the term of this patent is extended or adjusted under 35 U.S.C. 154(b) by 1064 days.

(21) Appl. No.: 16/655,565

(22) Filed: Oct. 17, 2019

(65) Prior Publication Data
US 2020/0123067 A1    Apr. 23, 2020

Related U.S. Application Data

(60) Provisional application No. 62/747,215, filed on Oct. 18, 2018.

(51) Int. Cl.
C04B 35/573 (2006.01)
C04B 35/628 (2006.01)
C04B 35/80 (2006.01)

(52) U.S. Cl.
CPC ...... *C04B 35/573* (2013.01); *C04B 35/62863* (2013.01); *C04B 35/62884* (2013.01);
(Continued)

(58) Field of Classification Search
CPC ........ C04B 35/62863; C04B 35/62884; C04B 2235/3826; C04B 2235/5244;
(Continued)

(56) References Cited

U.S. PATENT DOCUMENTS 3,799,701 A    3/1974   Rothman
5,853,485 A  * 12/1998  Rudolph ............... F16D 65/126
                                                      118/728

(Continued)

FOREIGN PATENT DOCUMENTS

CA        2430457 C  *  8/2012  ............. F01D 5/189

*Primary Examiner* — Michael G Miller
(74) *Attorney, Agent, or Firm* — Crowell & Moring LLP

(57) ABSTRACT

A method of fabricating cooling features on a CMC component may comprise compressing a fabric preform within tooling including holes and/or recesses facing the fabric preform. During the compression, portions of the fabric preform are pushed into the holes and/or recesses. Gases are delivered through the tooling to deposit a matrix material on exposed surfaces of the fabric preform while the fabric preform is being compressed. The matrix material builds up on the portions of the fabric preform pushed into the holes and/or recesses, and a rigidized preform with surface protrusions is formed. The tooling is removed, and the rigidized preform is densified, thereby forming a CMC component including raised surface features.

21 Claims, 2 Drawing Sheets

(52) U.S. Cl.
CPC ...... *C04B 35/80* (2013.01); *C04B 2235/3826* (2013.01); *C04B 2235/5244* (2013.01); *C04B 2235/5256* (2013.01); *C04B 2235/614* (2013.01); *C04B 2235/945* (2013.01)

(58) Field of Classification Search
CPC ...... C04B 2235/5256; C04B 2235/614; C04B 2235/945
See application file for complete search history.

(56) References Cited

U.S. PATENT DOCUMENTS

| | | | |
|---|---|---|---|
| 6,610,385 B2 | 8/2003 | Cairo | |
| 6,812,157 B1* | 11/2004 | Gadgil | C23C 16/45578 117/88 |
| 6,887,528 B2 | 5/2005 | Lau et al. | |
| 8,956,105 B2 | 2/2015 | Uskert et al. | |
| 9,453,421 B2 | 9/2016 | Cairo et al. | |
| 9,556,750 B2 | 1/2017 | Freeman et al. | |
| 9,758,436 B2 | 9/2017 | Lazur et al. | |
| 9,803,486 B2 | 10/2017 | Freeman et al. | |
| 9,896,954 B2 | 2/2018 | Walston et al. | |
| 2003/0129338 A1* | 7/2003 | Cairo | F23R 3/007 428/36.1 |
| 2007/0148349 A1* | 6/2007 | Fukada | H01L 21/31691 438/584 |
| 2007/0258811 A1 | 11/2007 | Shi et al. | |
| 2011/0293828 A1* | 12/2011 | Eberling-Fux | C04B 35/80 427/249.2 |
| 2013/0167374 A1 | 7/2013 | Kirby et al. | |
| 2014/0154073 A1 | 6/2014 | Cairo et al. | |
| 2015/0008613 A1* | 1/2015 | Bouillon | C04B 41/009 264/232 |
| 2018/0087973 A1* | 3/2018 | Shi | C23C 16/45578 117/88 |
| 2018/0200967 A1* | 7/2018 | Sutter | H01L 21/31691 438/584 |

* cited by examiner

METHOD OF FABRICATING COOLING FEATURES ON A CERAMIC MATRIX COMPOSITE (CMC) COMPONENT

RELATED APPLICATION

The present patent document claims the benefit of priority under 35 U.S.C. § 119(e) to U.S. Provisional Patent Application No. 62/747,215, which was filed on Oct. 18, 2018, and is hereby incorporated by reference in its entirety.

TECHNICAL FIELD

The present disclosure is related generally to ceramic matrix composites (CMCs) and more particularly to a method of fabricating cooling features on CMC components.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. In an attempt to improve turbine efficiency, combustor outlet temperatures continue to rise to improve cycle efficiency and power density.

Ceramic matrix composites (CMCs), such as silicon carbide-based CMCs, have been identified as candidate materials for components in the turbine section of jet engines due to their elevated temperature capability, low density, and low coefficient of thermal expansion. Consequently, the use of CMC components in the turbine section may offer the potential of reducing cooling air requirements and engine weight. It would be beneficial if cooling features could be incorporated into CMC components to further improve cooling effectiveness.

BRIEF SUMMARY

A method of forming raised surface features on a CMC component to promote cooling is described herein.

The method includes, according to one embodiment, compressing a fabric preform within tooling including holes and/or recesses facing the fabric preform such that, during the compression, portions of the fabric preform are pushed into the holes and/or recesses. Gases are delivered through the tooling to deposit a matrix material on exposed surfaces of the fabric preform while the fabric preform is being compressed. The matrix material builds up on the portions of the fabric preform pushed into the holes and/or recesses, and a rigidized preform with surface protrusions is formed. The tooling is removed, and the rigidized preform is densified, thereby forming a CMC component including raised surface features.

The method includes, according to another embodiment, enclosing a rigidized preform in tooling including holes and/or recesses facing the rigidized preform, and delivering gases through the holes and/or recesses to selectively deposit a matrix material on the rigidized preform. The matrix material builds up at locations adjacent to the holes and/or recesses, while the tooling acts as a mask to prevent deposition of the matrix material on the rigidized preform away from the holes and/or recesses. Accordingly, surface protrusions are formed on the rigidized preform. The tooling is removed, and the rigidized preform is densified, thereby forming a CMC component including raised surface features.

DETAILED DESCRIPTION

A method of fabricating raised surface features that may enhance the cooling effectiveness of a CMC component is described. These cooling enhancement features may take the form of localized pedestals or ribs on the surface of the CMC component. The amount of cooling air required to cool the CMC component may be reduced due to the presence of the raised surface features.

Figure 1:
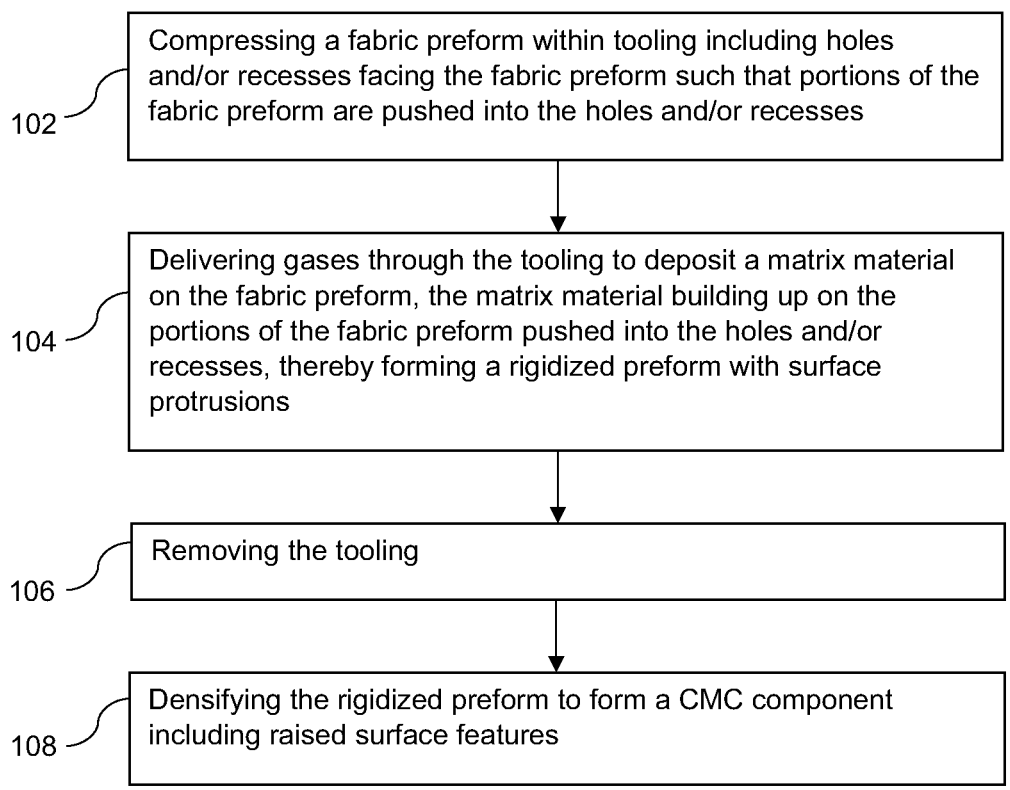
FIG. 1 shows a flow chart of a first embodiment of the method.

The flow chart of FIG. 1 shows a first embodiment of the method of forming raised surface features on a CMC component. The method may include compressing 102 a fabric preform within tooling including holes and/or recesses facing the fabric preform, such that, during the compression, portions of the fabric preform are pushed into the holes and/or the recesses, at least partially filling them. This may be described as "over-compressing" the fabric preform. The portions of the fabric preform partially filling the holes may be less compacted than parts of the fabric preform away from the holes/recesses. While the fabric preform is being compressed 102, gases are delivered 104 through the tooling to deposit a matrix material onto exposed surfaces of the fabric preform using a coating process known as chemical vapor infiltration (CVI) or rigidization. Consequently, individual fibers and/or fiber tows of the preform are coated with the matrix material. In addition, the matrix material builds up on the portions of the fabric preform pushed into the holes and/or the recesses. Thus, a rigidized preform with surface protrusions is formed. The tooling is then removed 106, and the rigidized preform is densified 108. Consequently, a CMC component including raised surface features for improved surface cooling during elevated temperature use, such as in a gas turbine engine, is formed.

The CMC component may comprise a matrix reinforced with silicon carbide fibers, carbon fibers, alumina fibers, aluminosilicate fibers, and/or other ceramic fibers. The matrix (and thus the matrix material referred to above) may comprise silicon carbide, silicon nitride, silicon nitrocarbide, and/or other ceramic compounds. Typically, the fibers are silicon carbide fibers and the fiber preform is a silicon carbide fiber preform. A ceramic matrix composite that includes a matrix comprising silicon carbide and fibers comprising silicon carbide may be referred to as a silicon carbide/silicon carbide composite or SiC/SiC composite. As used herein, the term "silicon carbide" may refer broadly to the compound SiC as well as to other silicon-containing carbides.

The fabric preform is typically formed in a predetermined geometry, such as an airfoil shape, from a stack or arrangement of plies each comprising a woven or nonwoven arrangement of fibers or fiber tows. The single- or multi-piece tooling that supports the fabric preform during the method may be designed as a "negative" of the predetermined geometry so as to maintain the shape of the fabric preform during rigidization. Similarly, the holes and/or recesses may be designed as a negative pattern of the raised surface features to be produced on the surface of the CMC component. Accordingly, the holes and/or recesses may be referred to as "negative features" in the tooling. It is understood that what is described as a "hole" may extend through the thickness of the tooling, whereas the term "recess" may describe an indentation in the tooling that does not extend through the thickness.

The holes and/or recesses (negative features) in the tooling intended to define the raised surface features may represent a modification of a conventional array of CVI tooling holes and/or may utilize the conventional array as a feeder system. For example, the gases may be delivered through passageways in the tooling that terminate in the negative features. Other channels may be used exclusively to feed gases to other parts of the fabric preform and thus may terminate in separate, smaller-size holes ("conventional CVI holes"). In other words, the gases may be delivered 104 to the fabric preform via the negative features in the tooling alone or via a combination of the negative features and conventional CVI holes. Generally speaking, the negative features in the tooling may be sized to accommodate the portions of the fabric preform forced in during the over-compression. More specifically, the negative features may be larger in size (e.g., width or diameter) than the conventional CVI holes. Thus, in some cases the tooling may include a bimodal distribution of hole sizes.

The intentional build-up 104 of the matrix material on the portions of the fabric preform pushed into the negative features may be controlled by varying the gas pressure, concentration of the gas species, and the gas flow rates. The gases employed in the deposition process may depend on the matrix material to be formed. In one example, where the matrix material includes silicon carbide, the gases may include methyltrichlorosilane ($CH_3SiCl_3$) and hydrogen gas ($H_2$). Other gases suitable for forming silicon carbide or other matrix materials at elevated temperatures may also or alternatively be employed. The gases employed in the process may be provided by one or more gas sources external to the tooling.

After forming the surface protrusions, the tooling may be removed 106. The tooling may be a single- or multi-piece tool fabricated of a high-temperature resistant material. Densification 108 is carried out to form the final CMC component. The densification 108 may entail applying one or more of the following processes known in the art to the rigidized preform: slurry infiltration; infiltration of a preceramic polymer followed by pyrolysis; and melt infiltration. In slurry infiltration, ceramic particles (e.g., silicon carbide particles) in a liquid carrier such as water may be infiltrated into the rigidized preform, followed by drying. When a preceramic polymer is infiltrated into the rigidized preform, an additional pyrolysis step may be employed to convert the preceramic polymer into the ceramic matrix material (e.g., silicon carbide). Melt infiltration 108 of the rigidized preform may be carried out at a temperature that depends on the metal or alloy forming the melt. Generally speaking, the temperature for melt infiltration is at or above $T_m$ of the metal or alloy, which may be silicon or a silicon alloy. Upon cooling, the CMC component including raised surface features is formed. Typically, melt infiltration is carried out for a time duration of several minutes to hours, depending in part on the size and complexity of the CMC component. Melt infiltration is normally carried out after slurry infiltration or after infiltration with a preceramic polymer and pyrolysis, as described above, to achieve the desired densification of the CMC component.

The raised surface features that result may comprise pedestals or ribs, for example. The pedestals may take the form of discrete surface features having a length-to-width aspect ratio of about one (e.g., less than 2, and more typically less than 1.5). Typically, the pedestals have a circular or polygonal cross-sectional shape (e.g., circle, square, triangle, pentagon, or hexagon). Alternatively, the pedestals may have an irregular cross-sectional shape. The ribs take the form of elongated surface features that may have a length-to-width aspect ratio of at least about 2, and more typically at least about 10. The ribs may be straight and/or curved. The raised surface features may include the matrix material and/or portions of the fibers.

Typically, a spacing between the raised surface features is at least about 0.025 in (0.064 cm). The raised surface features may have a height within a range from about 0.010 in (0.025) to about 0.040 in (0.10 cm). The size and shape of the raised surface features is determined in large part by the geometry of the holes or recesses in the tooling.

Figure 2:
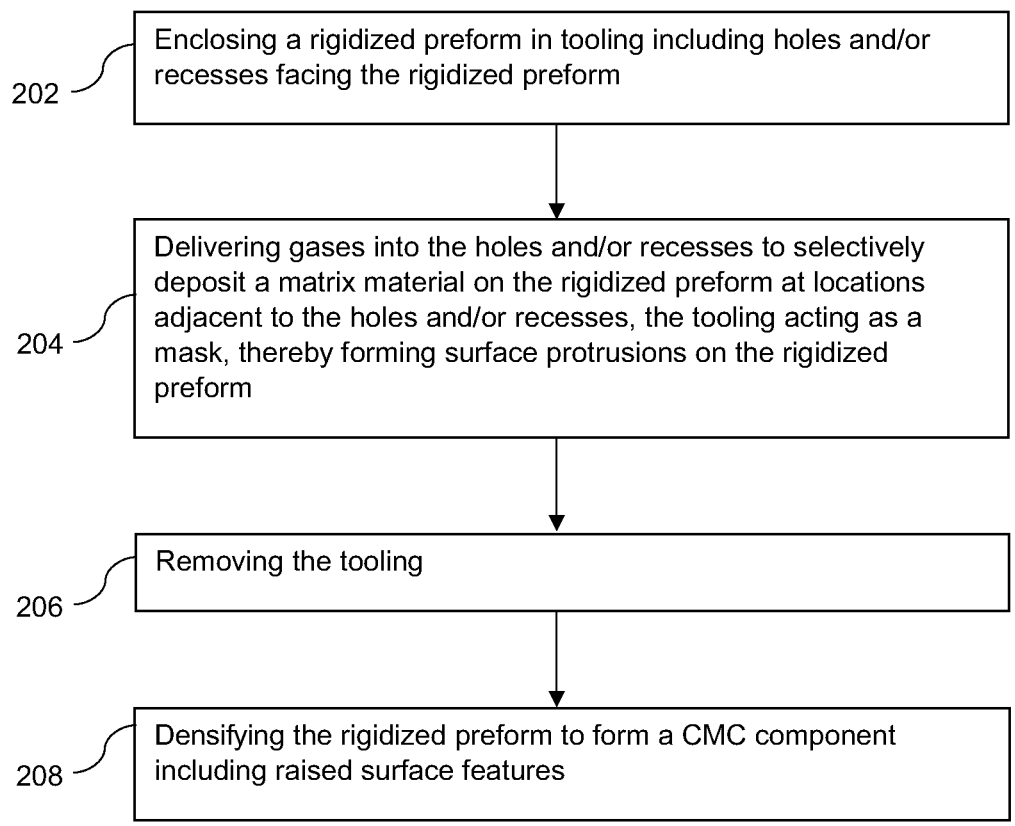
FIG. 2 shows a flow chart of a second embodiment of the method.

The flow chart of FIG. 2 shows a second embodiment of the method of forming raised surface features on a CMC component. The method includes enclosing 202 a rigidized preform in tooling including holes and/or recesses ("negative features") facing the rigidized preform. In this embodiment, the rigidized preform is not compressed within the tooling; in fact, there is no compaction pressure applied to the tooling during delivery of the gases, as doing so could fracture the rigidized part. Instead, the tooling serves to contain the rigidized preform and to function as a mask during matrix material deposition. Gases are delivered 204 to the holes and/or recesses to selectively deposit a matrix material on the rigidized preform at locations adjacent to the holes and/or recesses, while the tooling acts as a mask to prevent deposition of the matrix material on the rigidized preform away from the holes and/or recesses. Accordingly, the matrix material is built up on the rigidized preform within the holes and/or recesses to form surface protrusions. The tooling is removed 206, and the rigidized preform is densified to form a CMC component including raised surface features.

Given that this embodiment of the method begins with a rigidized preform, it is understood that a conventional CVI process may be carried out first, prior to enclosing the rigidized preform in the tooling. In the conventional CVI process, matrix material is deposited onto the fabric preform to rigidize the fabric without forming the surface protrusions. During the conventional CVI process, the fabric preform is not over-compressed, as described in the first embodiment, and conventional CVI tooling—which does not include the negative features described above—is employed. The holes on the conventional CVI tooling (conventional CVI holes) are typically significantly smaller in size than the negative features. For example, a width or diameter of the holes may be less than 50% of a width or diameter of the negative features. In addition, the compressive stress applied to the tooling during conventional CVI may be much lower (e.g., at least about 50% lower) that that employed in the first embodiment, where the fabric preform is over-compressed. The result of the conventional CVI process is a rigidized preform, which may then undergo the processing summarized in the flow chart of FIG. 2 using a second set of tooling to form the CMC component including the raised surface features.

The CMC component may have any of the characteristics described above for the first embodiment. Preferably, the CMC component includes a matrix comprising silicon carbide reinforced with silicon carbide fibers. In this case, the fabric preform and the rigidized preform may comprise silicon carbide fibers, and the matrix material deposited during CVI may comprise silicon carbide.

Returning to the flow chart of FIG. 2, the gases are delivered 204 into the negative features of the tooling for selective deposition of the matrix material on the rigidized preform while the tooling acts as a mask. The tooling employed in the second embodiment includes negative features (holes and/or recesses) as in the first embodiment, but the tooling need not be configured to withstand a high compressive stress, as in the first embodiment. In addition, the tooling may be designed to enhance mass transfer within the negative features during deposition. For example, a larger hole may feed a smaller negative feature in the tooling, or the negative features may include tapered holes, such that reactant gas flow and concentration may be improved.

As described above, the gases may be selected based on the matrix material to be formed. In one example, where the matrix material includes silicon carbide, the gases may include methyltrichlorosilane ($CH_3SiCl_3$) and hydrogen gas ($H_2$). Other gases suitable for forming silicon carbide or other matrix materials at elevated temperatures may also or alternatively be employed. The gases may be transported from one or more gas sources external to the tooling into the negative features, e.g., through channels in the tooling that terminate in the holes and/or recesses. The intentional build-up of the matrix material into the holes and/or recesses to form the surface protrusions may be controlled by varying the gas pressure, concentration of the gas species, and/or the gas flow rates, where more aggressive deposition conditions may be employed than during conventional CVI. It is desired to shift from surface controlled kinetics to a mass transport controlled reaction for the deposition of the raised features in this embodiment. Accordingly, the surface protrusions may be formed in a relatively short period of deposition time, and the porosity inherent to the rigidized preform may be maintained to allow for subsequent CMC processing steps.

After forming the surface protrusions, the tooling may be removed 206. The tooling may be a single- or multi-piece tool fabricated of a high-temperature resistant material. Densification 208 is carried out to form the final CMC component. The densification 208 may entail applying one or more of the following processes known in the art to the rigidized preform: slurry infiltration; infiltration of a preceramic polymer followed by pyrolysis; and melt infiltration. In slurry infiltration, ceramic particles (e.g., silicon carbide particles) in a liquid carrier such as water may be infiltrated into the rigidized preform, followed by drying. When a preceramic polymer is infiltrated into the rigidized preform, an additional pyrolysis step may be employed to convert the preceramic polymer into the ceramic matrix material (e.g., silicon carbide). Melt infiltration 208 of the rigidized preform may be carried out at a temperature that depends on the metal or alloy forming the melt. Generally speaking, the temperature for melt infiltration is at or above $T_m$ of the metal or alloy, which may be silicon or a silicon alloy. Upon cooling, the CMC component including raised surface features is formed. Typically, melt infiltration is carried out for a time duration of several minutes to hours, depending in part on the size and complexity of the CMC component. Melt infiltration is normally carried out after slurry infiltration or after infiltration with a preceramic polymer and pyrolysis, as described above, to achieve the desired densification of the CMC component.

The raised surface features that result may comprise pedestals or ribs, as in the first embodiment. The pedestals may take the form of discrete surface features having a length-to-width aspect ratio of about one (e.g., less than 2, and more typically less than 1.5). Typically, the pedestals have a circular or polygonal cross-sectional shape (e.g., circle, square, triangle, pentagon, or hexagon). Alternatively, the pedestals may have an irregular cross-sectional shape. The ribs take the form of elongated surface features that may have a length-to-width aspect ratio of at least about 2, and more typically at least about 10. The ribs may be straight and/or curved. The raised surface features may include the matrix material and/or portions of the fibers.

Typically, a spacing between the raised surface features is at least about 0.025 in (0.064 cm). The raised surface features may have a height within a range from about 0.010 in (0.025) to about 0.040 in (0.10 cm). The size and shape of the raised surface features is determined in large part by the geometry of the holes or recesses in the tooling.

The method described herein according to two embodiments may further comprise other conventional steps in CMC fabrication, such as laying up of plies to form a fabric preform having a predetermined shape, and/or application of a fiber interphase coating such as boron nitride to the fabric preform prior to rigidization. A rigidized preform may be formed by applying a matrix material to exposed surfaces of a fiber preform during a CVI process, as described. A preceramic polymer may be infiltrated into the rigidized preform, followed by pyrolysis to form the matrix material. The rigidized fiber preform may also or alternatively be infiltrated with a slurry comprising silicon carbide particles in a liquid carrier. The slurry may further include reactive elements such as carbon that can react with molten silicon or a silicon alloy during melt infiltration, thereby reducing free silicon in the bulk of the CMC component.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of fabricating cooling features on a CMC component, the method comprising:
    compressing a fabric preform within tooling including holes and/or recesses facing the fabric preform;
    pushing portions of the fabric preform into the holes and/or recesses;

delivering gases through the tooling to deposit a matrix material on exposed surfaces of the fabric preform during the compression, the gases being delivered through channels in the tooling terminating in the holes and/or recesses, the matrix material building up on the portions of the fabric preform pushed into the holes and/or recesses, thereby forming a rigidized preform with surface protrusions;

removing the tooling; and densifying the rigidized preform, thereby forming a CMC component including raised surface features.

2. The method of claim 1, wherein the fabric preform comprises silicon carbide fibers and the matrix material comprises silicon carbide, and wherein the CMC component includes a silicon carbide matrix reinforced with the silicon carbide fibers.

3. The method of claim 1, wherein the gases include methyltrichlorosilane ($CH_3SiCl_3$) and hydrogen gas ($H_2$).

4. The method of claim 1, wherein the raised surface features comprise pedestals or ribs.

5. The method of claim 4, wherein the pedestals have a cross-sectional shape selected from the group consisting of: circle, square, triangle, pentagon, and hexagon.

6. The method of claim 4, wherein each of the ribs has a length-to-width aspect ratio of at least about 2.

7. The method of claim 6, wherein the length-to-width aspect ratio is at least about 10.

8. The method of claim 4, wherein the ribs are curved.

9. The method of claim 1, wherein a spacing between the raised surface features is at least about 0.06 cm.

10. The method of claim 1, wherein the raised surface features have a height within a range from about 0.03 cm to about 0.10 cm.

11. The method of claim 1, wherein the tooling includes a bimodal distribution of sizes of the holes and/or recesses.

12. A method of fabricating cooling features on a CMC component, the method comprising:

vapor-depositing a matrix material onto a fabric preform to form a rigidized preform;

enclosing the rigidized preform in tooling without compaction of the rigidized preform, the tooling including holes and/or recesses facing the rigidized preform;

delivering gases through the holes and/or recesses to selectively deposit a the matrix material on the rigidized preform at locations adjacent to the holes, the tooling acting as a mask to prevent deposition of the matrix material on the rigidized preform away from the holes, and the matrix material being built up to form surface protrusions on the rigidized preform;

removing the tooling; and densifying the rigidized preform, thereby forming a CMC component including raised surface features.

13. The method of claim 12, wherein the rigidized preform comprises silicon carbide fibers and the matrix material comprises silicon carbide, and wherein the CMC component includes a silicon carbide matrix reinforced with the silicon carbide fibers.

14. The method of claim 12, wherein the gases include methyltrichlorosilane ($CH_3SiCl_3$) and hydrogen gas ($H_2$).

15. The method of claim 12, wherein the holes and/or recesses comprise tapered holes and/or recesses.

16. The method of claim 12, wherein the raised surface features comprise pedestals or ribs.

17. The method of claim 16, wherein each of the ribs has a length at least two times greater than a width thereof.

18. The method of claim 16, wherein the ribs are curved.

19. The method of claim 12, wherein a spacing between the raised surface features is at least about 0.06 cm.

20. The method of claim 12, wherein the raised surface features have a height within a range from about 0.03 cm to about 0.10 cm.

21. The method of claim 12, wherein the tooling includes a bimodal distribution of sizes of the holes and/or recesses.

\* \* \* \* \*